(12) United States Patent
Krause et al.

(10) Patent No.: US 10,230,750 B2
(45) Date of Patent: Mar. 12, 2019

(54) SECURE COMPUTING ENVIRONMENT

(71) Applicants: Lee Krause, Indialantic, FL (US);
Steve Hamby, Hoschton, GA (US);
Jacob Staples, Hooksett, NH (US);
Attila Ondi, Sebastian, FL (US)

(72) Inventors: Lee Krause, Indialantic, FL (US);
Steve Hamby, Hoschton, GA (US);
Jacob Staples, Hooksett, NH (US);
Attila Ondi, Sebastian, FL (US)

(73) Assignee: Securboration, Inc., Melbourne, FL (US)

( * ) Notice: Subject to any disclaimer, the term of this patent is extended or adjusted under 35 U.S.C. 154(b) by 262 days.

(21) Appl. No.: 15/177,296

(22) Filed: Jun. 8, 2016

(65) Prior Publication Data

US 2017/0244748 A1 Aug. 24, 2017

Related U.S. Application Data (60) Provisional application No. 62/172,389, filed on Jun. 8, 2015.

(51) Int. Cl.
*H04L 29/06* (2006.01)

(52) U.S. Cl.
CPC ...... *H04L 63/1425* (2013.01); *H04L 63/1433* (2013.01); *H04L 63/20* (2013.01)

(58) Field of Classification Search
CPC .. H04L 63/1425; H04L 63/1433; H04L 63/20
USPC .......................................................... 726/1
See application file for complete search history.

(56) References Cited

U.S. PATENT DOCUMENTS

| | | | | |
|---|---|---|---|---|
| 7,516,476 B1 * | 4/2009 | Kraemer | ............... | G06F 21/604 726/1 |
| 8,869,235 B2 * | 10/2014 | Qureshi | .................. | H04L 63/20 713/150 |
| 2008/0109822 A1 * | 5/2008 | Chokshi | .............. | H04L 41/0686 719/318 |
| 2009/0307485 A1 * | 12/2009 | Weniger | .............. | H04L 63/1458 713/153 |
| 2012/0078994 A1 * | 3/2012 | Jackowski | .............. | H04L 47/19 709/202 |
| 2012/0304007 A1 * | 11/2012 | Hanks | ..................... | H04L 67/12 714/26 |
| 2015/0101048 A1 * | 4/2015 | Sridhara | ................. | G06F 21/55 726/23 |
| 2015/0186296 A1 * | 7/2015 | Guidry | .................... | G06F 21/54 713/193 |
| 2015/0222708 A1 * | 8/2015 | Addepalli | ............. | H04W 4/046 709/217 |

OTHER PUBLICATIONS

Seo, "Abnormal Behavior Detection to Identify Infected Systems Using the APChain Algorithm and Behavioral Profiling", Sep. 4, 2018, Wiley, pp. 1-24 (Year: 2018).*

* cited by examiner

*Primary Examiner* — Taghi T Arani
*Assistant Examiner* — Gregory A Lane
(74) *Attorney, Agent, or Firm* — Danielson Legal LLC (57) ABSTRACT

Methods and systems for providing secure computing environments. Features of the present invention use a plurality of integrated security controls to ensure security of a computing environment. More specifically, features of the present invention detect discrepancies between a node's behavior and a defined policy to identify and remedy malicious behavior.

13 Claims, 7 Drawing Sheets

SECURE COMPUTING ENVIRONMENT

CROSS-REFERENCE TO RELATED APPLICATIONS

This application claims priority to U.S. Provisional Appl. No. 62/172,389 entitled "Secure Computing Environment," filed on Jun. 8, 2015, and is related to U.S. patent application Ser. No. 14/085,493 entitled "Cyber-Semantic Account Management System," filed Nov. 20, 2013, the entire contents of which are both hereby incorporated by reference.

TECHNICAL FIELD

The present invention generally relates to methods and systems for providing secure computing environments and, more particularly, to methods and systems for providing secure computing environments by integrating security controls.

BACKGROUND

Institutions such as small-to-mid size (SMB) businesses have been under increasing pressure to prevent and recover from cyberattacks. Cyberattacks generally involve hackers or other threat actors compromising and installing malicious software on a host device.

Existing techniques that attempt to detect intrusion and malicious activity typically require the definition of rules manually before monitoring begins. Accordingly, this makes them difficult to use due to the effort associated with manual rule definition and their susceptibility to zero-day attacks that do not match existing rule sets.

Many existing defensive cyber security technologies such as the Host Based Security System (HBSS) are based on the concept of agents that run on and secure a platform. These agents generally rely on signatures and baseline behaviors to identify known threats. Once identified, agents prevent these threats from executing. For example, HBSS manages various aspects of host security (firewall and port restrictions, USB device restrictions, security auditing, and rogue device detection among others) and runs as a background process at all times.

However, agent-based systems, while effective at stopping attacks using known tools and exploits, do not adequately protect against sophisticated zero day attacks and are easily circumvented by attackers who modify existing threats to produce new (and therefore unknown) signatures or who exploit known weaknesses in the agents themselves. Additionally, these agents utilize policies focused on preventing dangerous behaviors from occurring such as isolating the threat. These policies are ill-suited to repair a comprised system after a problem has occurred.

Another drawback of agent-based systems is that agents consume valuable resources on their host machine, thereby reducing its responsiveness. This may be particularly burdensome in environments where many virtual endpoints reside on the same physical machine.

A need exists, therefore, for methods and systems for security that overcome these disadvantages.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for providing a secure computing environment. The method includes defining at least one policy of prescribed behavior for at least one node in the environment; executing at least one process on at least one node in the environment; determining a discrepancy between the prescribed behavior of the at least one node based on the at least one policy and actual behavior of the at least one node; and performing at least one remedial action based upon the at least one policy upon determining the discrepancy between the prescribed behavior of the at least one node and the actual behavior of the at least one node.

In one embodiment, the at least one remedial action includes one or more of restarting an exploited node within the environment and generating a report.

In one embodiment, the actual behavior of the at least one node includes data regarding the actual behavior of the at least one node obtained in at least substantially real time.

In one embodiment, the actual behavior of the at least one node includes at least one of memory usage, a number of processes being executed, and processor load.

In one embodiment, the method further includes deriving at least one rule describing a behavior pattern of at least one node using a determined discrepancy.

In one embodiment, the method further includes classifying the at least one process as malicious or non-malicious based on the actual behavior of the at least one node. The method may further include relocating a second process from a first node to a second node in response to an attack upon the environment.

In one embodiment, the method further includes modifying an outgoing message from a second process to change an operating system identifier or an application identifier in the outgoing message.

In one embodiment, the method further includes changing an internet protocol (IP) address of a node in the environment.

In one embodiment, the method further includes creating a transactional data set to accomplish a set of transactions; and comparing the transactional data set to a reference data set after the process is executed on the at least one node to determine whether any changes were made to the transactional data set.

In another aspect, embodiments relate to a secure computing system. The system includes at least one node for executing at least one process; and a classification module configured to execute at least one process on at least one node in the environment; determine a discrepancy between the prescribed behavior of the at least one node based on at least one policy of prescribed behavior and the actual behavior of the node; and perform at least one remedial action based upon the at least one policy upon determining the discrepancy between the prescribed behavior of the at least one node and the actual behavior of the at least one node.

In one embodiment, the at least one remedial action includes one or more of restarting an exploited node within the environment and generating a report.

In one embodiment, the actual behavior of the at least one node includes data regarding the actual behavior of the at least one node obtained in at least substantially real time.

In one embodiment, the actual behavior of the at least one node includes at least one of memory usage, a number of processes being executed, and processor load.

In one embodiment, the classification module is further configured to derive at least one rule describing a behavior pattern of at least one node using a determined discrepancy.

In one embodiment, the classification module is further configured to classify the first process as malicious or non-malicious based on the behavior of the at least one node.

In one embodiment, the classification module is further configured to relocate a second process from a first node to a second node in response to an attack upon the environment.

In one embodiment, the classification module is further configured to modify an outgoing message from a second process to change an operating system identifier or an application identifier in the outgoing message.

In one embodiment, the classification module is further configured to change an internet protocol (IP) address of a node in the environment.

In one embodiment, the secure system is readily deployable to at least one external enterprise system.

In yet another aspect, embodiments relate to a computer readable medium containing computer-executable instructions for performing a method for providing a secure computing environment. The medium includes computer-executable instructions for defining at least one policy of prescribed behavior for at least one node in the environment; computer-executable instructions for executing at least one process on at least one node in the environment; computer-executable instructions for determining a discrepancy between the prescribed behavior of the at least one node based on the at least one policy and the actual behavior of the at least one node; and computer-executable instructions for performing at least one remedial action based on the at least one policy upon determining the discrepancy between the prescribed behavior of the at least one node and the actual behavior of the at least one node.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Features of the present invention provide a secure computing environment that overcomes the disadvantages of existing techniques mentioned above. The secure computing module 106: (1) is decoupled from infrastructure on which protection mechanisms are executed; (2) is minimally invasive to existing infrastructure; (3) requires minimal operator effort to configure and deploy; (4) works out-of-the-box with a large number of platforms; and (5) utilizes, to the maximum extent possible, existing protocols, formats, and standards.

Figure 1:
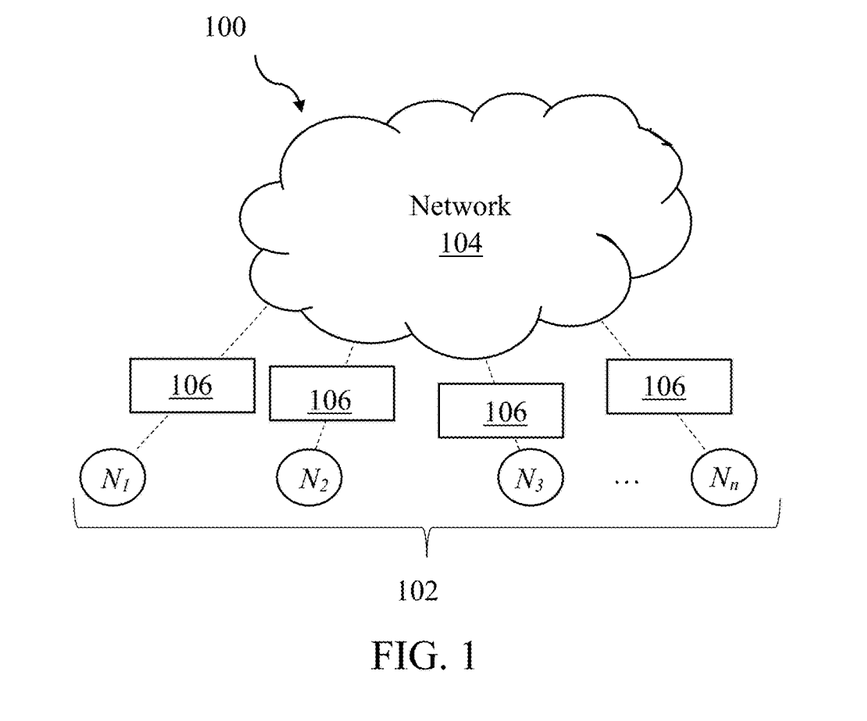
FIG. 1 depicts a secure computing environment in accordance with one embodiment.

FIG. 1 illustrates a secure computing environment 100 in accordance with one embodiment. The environment may include a plurality of nodes N 102 in operable connectivity via a network 104. In the context of the present application, the term "node" may refer to any type of device or location in which a virtual machine may be executed. These nodes N 102 may each be encrypted to require hackers or other threat actors (hereinafter "threat actors") to either break the cryptography to obtain access to data on any of the nodes N 102. The environment 100 also includes one or more secure computing modules 106 configured with or otherwise in operable communication with the nodes N 102.

Figure 2:
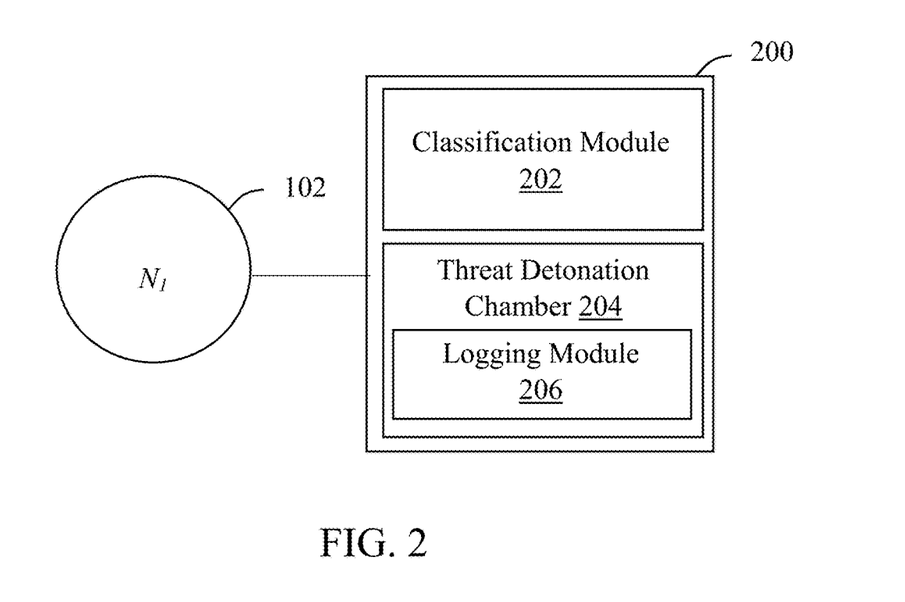
FIG. 2 depicts a secure computing module in accordance with one embodiment.

FIG. 2 illustrates a high-level overview of secure computing module 200 (such as the secure computing module 106 of FIG. 1) in accordance with one embodiment. In this embodiment, the secure computing module 200 may include a classification module 202 and a threat detonation chamber 204. Suspect files may be loaded into the threat detonation chamber 204 and probed or executed in order to identify malicious activity. Any suspicious activity may be logged and categorized by a logging module 206. For example, an observed attempt by an executing suspect file to read a file and initiate an outgoing FTP transfer may be indicative of an exfiltration attempt. Based on these observations during the testing stage, the classification module 202 may classify the file as malicious or benign.

Figure 3:
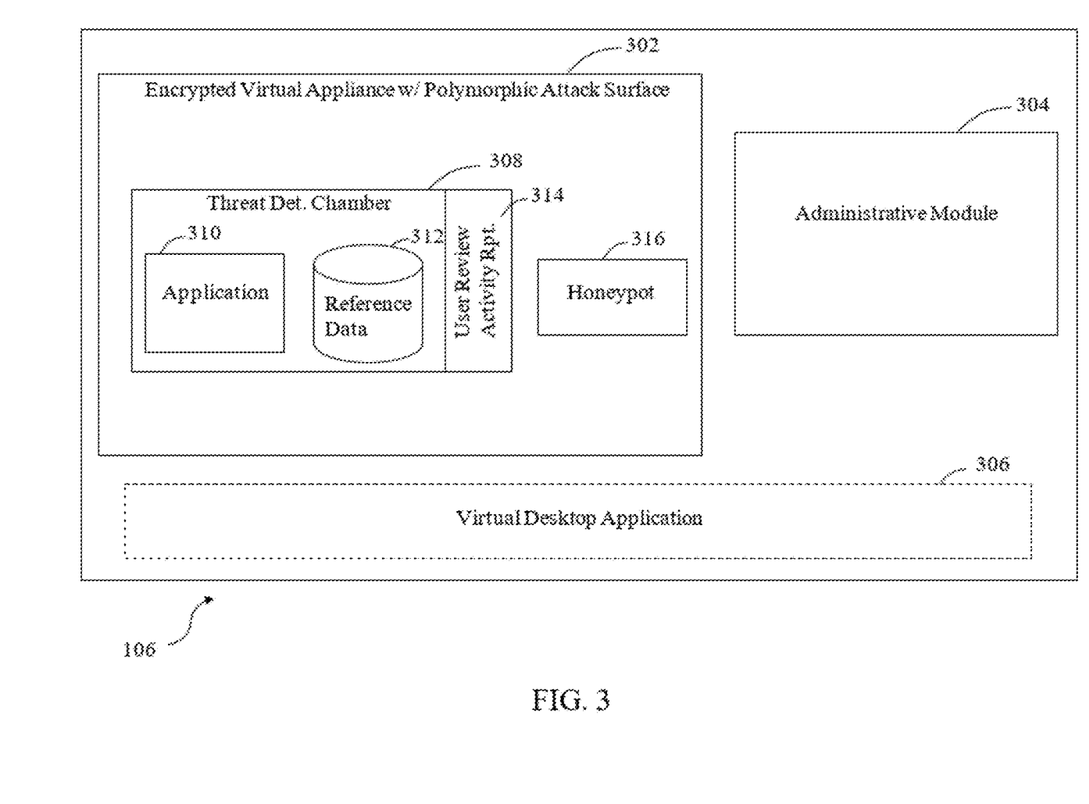
FIG. 3 depicts a secure computing module in accordance with another embodiment.

FIG. 3 illustrates the secure computing module 106 of FIG. 1 in more detail. The secure computing module 106 may include an encrypted virtual appliance with a polymorphic attack surface (PAS) 302, an administrative module 304, and a virtual desktop application 306. Using these components, the secure computing module 106 implements several key security controls that are integrated to form a single, secure computing module.

Features of the present invention therefore allow for the creation of a dynamic model of how individual nodes interact with larger enterprise systems over time in order to detect when unexpected and potentially dangerous behaviors emerge, in contrast to existing techniques which rely upon known threat signatures or known threat behavior heuristics.

The secure computing module 106 is not required to reside on any individual system within the enterprise. Rather, features of the present invention utilize an architecture distributed across an arbitrary number of nodes and, as such, does not present a single point of failure. This creates a cross-platform, low-cost, scalable, and decentralized capability orthogonal (and therefore complementary to) a defense-in-depth posture based on existing technologies such as antivirus software, firewalls, and code hardening suites.

The encrypted virtual appliance 302 includes a threat detonation chamber 308 within which access to an application 310 is performed and also includes a reference standard database 312. The threat detonation chamber 308 may output an activity report 314 describing the execution of the application 310. The encrypted virtual appliance 302 may also include a honeypot module 316.

Figure 4:
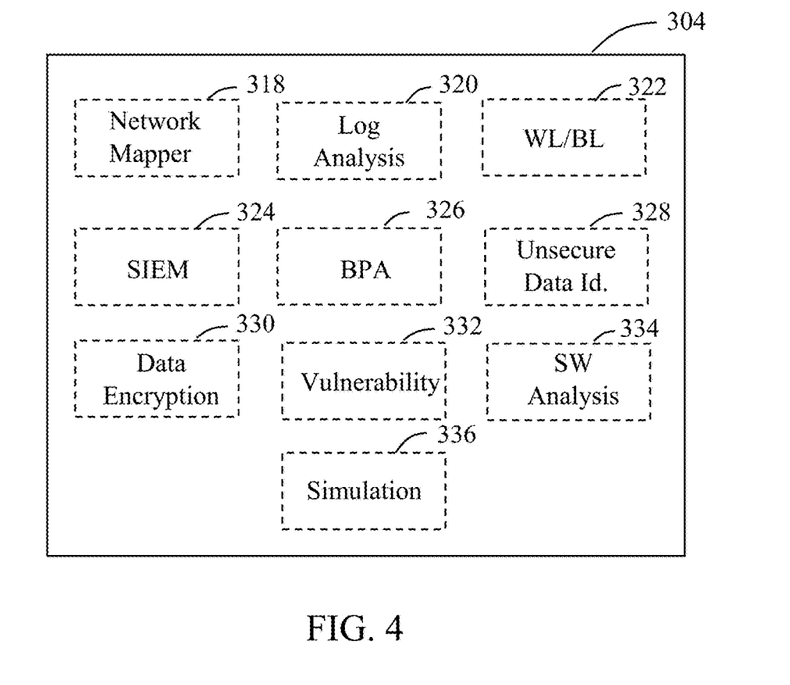
FIG. 4 depicts the administrative module of FIG. 3 in accordance with one embodiment.

The administrative module 304 is illustrated in more detail in FIG. 4 and may contain several modules to offer cyber capabilities based on policy-defined rules to provide a secure computing environment. These modules include, but are not limited to, a network mapping module 318, a log analysis module 320, a whitelist/blacklist (WL/BL) module 322, a security infrastructure and event management module (SIEM) 324, a behavioral pattern analysis (BPA) module 326, an unsecure data identification module 328, a data encryption module 330, a vulnerability module 332, a software analysis (and injection) module 334, and a simulation module 336.

The network mapping module 318 may be configured to map or otherwise identify all devices in a specific network intermittently or continuously. These devices may include, but are not limited to, smartphones, tablets PCs, laptops, and other types of hardware devices such as servers, routers, and connected endpoints. The network mapping module 318 may be configured to send out packets to hosts and create a network map based on the received response(s).

The network mapping module 318 may be in communication with the whitelist/blacklist (WL/BL) module 322 which creates a list of permitted (accepted) devices. These devices maybe designated based on their operating system, MAC address, IP address, etc. This list may be designed to block non-approved devices from connecting to the network (and to other devices). Additionally, a user interface may enable a user to stop connections to devices that are not on the whitelist, or enable a user to add a certain device to the whitelist. The WL/BL module 322 may additionally or alternatively create a blacklist explicitly defining non-approved devices, such that any device on the blacklist is prohibited from connecting to the network and other devices.

The WL/BL module 322 may also create lists of permitted/non-permitted applications. For example, the WL/BL module 322 may use process monitoring tools on each device to determine what processes are running on each device (e.g., in terms of specific versions and/or configurations). Additionally, a user interface may enable an administrator to stop processes that are not on an "approved applications" list or that are on a "do not run" list, such as malware. The WL/BL module 322 may work in conjunction with file integrity checking procedures to identify new software that has been installed and that existing software has not been modified.

The log analysis module 320 may be configured to track all activity occurring on a node. This activity may include dates and times of logging in and logging out of a network, as well as any communications sent and received. Additionally, the log analysis module 320 may correlate logs from network devices, servers, databases, applications, or the like to provide an end-to-end view of users' transactions. The log analysis module 320 may support writing rules to network devices (e.g., firewalls, routers) to block packets and/or block and disconnect user sessions.

Information logged by the log analysis module 320 may also include weblog data such as IP address information, browsing history, download data, and time information. Any desired amount of data may be logged. For example, the log analysis module 320 may use a day's worth of data, an hour of data, a week of data, a month of data, a year of data, etc. The log analysis module 320 may also use statistical analysis to analyze the logged data. In one embodiment, statistical analysis may be performed to obtain minimum, maximum, average, and standard deviation values for given set of data.

Data from log analysis modules 320 from various systems may be integrated by the SIEM module 324 to correlate or otherwise validate long-running transactions over various systems. This information may be communicated to the BPA module 326 to, for example, identify any anomalous behavior.

For example, the SIEM module 324 may aggregate and correlate logs across multiple devices and applications on the network to provide insight into at least data flow across a transaction or set of transactions. This information may be used to recognize vulnerabilities based on transactions and network device logs. Additionally, the SIEM module 324 may integrate data from multiple log analysis modules 320 into a single log format.

Data from log analysis modules 320 may be audited to verify compliance with one or more policies over a plurality of transactions. For example, a business entity may have a policy that states "a separated employee or affiliate will have their system access terminated within 8 hours of separation." To ensure this policy is followed, there may be a long-running transaction consisting of multiple processes. These processes may include the actual process of separating the employee, which may be performed by human resource personnel (e.g., user "HR1"), and the process of removing the separated employee's access to the system, which may be performed by IT personnel (e.g., user "ITSec2"). Accordingly, data from log analysis modules 320 of various systems may be used to monitor this long-running transaction and ensure that the second process occurs within the timeframe specified by the policy after the completion of the first process.

The unsecure data identification module 326 may be configured to find unsecure data. For example, the unsecure data identification module 326 may be configured to find unencrypted credit card numbers, payment card industry (PCI) numbers, social security numbers, bank account numbers, telephone numbers, health-related information, and more. To identify the unencrypted data, the unsecure data identification module 326 may rely on standard regular expression parsing techniques to find data that conforms to lists (e.g., the Federal Reserve Bank list of ACH payment IDS).

It follows that the data encryption module 330 may encrypt any data as needed. For example, any data identified by the unsecure data identification module 328 may be subsequently encrypted by the data encryption module 330.

The data encryption module 330 may also encrypt data based on user attributes. Certain users in a system may have privileges limiting what they can access. For example, some users may only have low-level security clearance that does not allow them to view or otherwise access certain data (e.g., data deemed confidential). As another example, a human resource employee may be able to view east coast employee data but not west coast employee data. This prevents users without access to the required certificate from seeing data encrypted with the certificate.

The vulnerability analysis module 332 may use third party tools to detect common vulnerabilities and exposures, as well as penetration tools to test known threat actor attack patterns. Additionally, the vulnerability analysis module 332 may test hypothetical patterns. For example, security features of the present invention may be tested against possible attack vectors to determine their susceptibility to these hypothetical attacks in the future. The vulnerability analysis module 332 may also provide reports of any vulnerabilities, as well as reference materials to understand the potential for and consequence of an attack and potential solutions.

For example, one example of a penetration tool to test a known attack pattern is the software analysis (and injection) module 334, which may find code-based security issues such as SQL vulnerabilities to an SQL injection attack and single factor authentication. If any such issues are found, the software analysis module 334 may apply any required software changes to resolve the identified vulnerability.

Another example of a penetration tool is the simulation module 336, which may be configured to test a security plan by implementing simulated attacks. For example, these simulated attacks may include penetration testing to find additional vulnerabilities not detected by the vulnerability analysis module 332. In one embodiment, for example, the simulation module 336 may send simulated phishing emails to users to find users that need a refresher training on phishing concepts (i.e., users who open the link in the email). The link in the email could then open a phishing refresher training course.

Although the administrative module 304 of FIG. 4 is illustrated with several modules, a given administrative module 304 may be configured with less than all modules 318-336. Additionally or alternatively, other types of security controls in addition to or in lieu of those illustrated in FIG. 4 may be used to provide a secure computing environment. As discussed below, the various modules may be implemented on a deployable appliance to gather information regarding a particular enterprise. Depending on the policies of the particular enterprise, one or more of these modules 318-336 may or may not be included.

Figure 5:
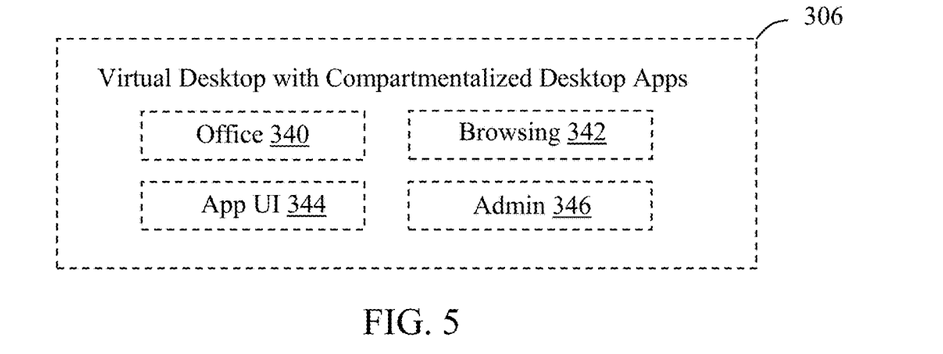
FIG. 5 depicts the virtual desktop application of FIG. 3 in accordance with one embodiment.

FIG. 5 illustrates the virtual desktop application 306 of FIG. 3 in more detail. The virtual desktop application 306 provides another level of security control. The virtual desktop application 306 may be presented to a user via a user interface of device such as a smartphone, tablet, PC, or laptop.

The virtual desktop application 306 may include one or more desktop applications. For example, it may contain virtual machines for desktop applications such as office tools 340, web browsing tools 342, application user interfaces 344, and administrative tools 346. This compartmentalized approach enables, among other features, one application to be compromised without affecting the other compartmentalized applications.

Figure 6:
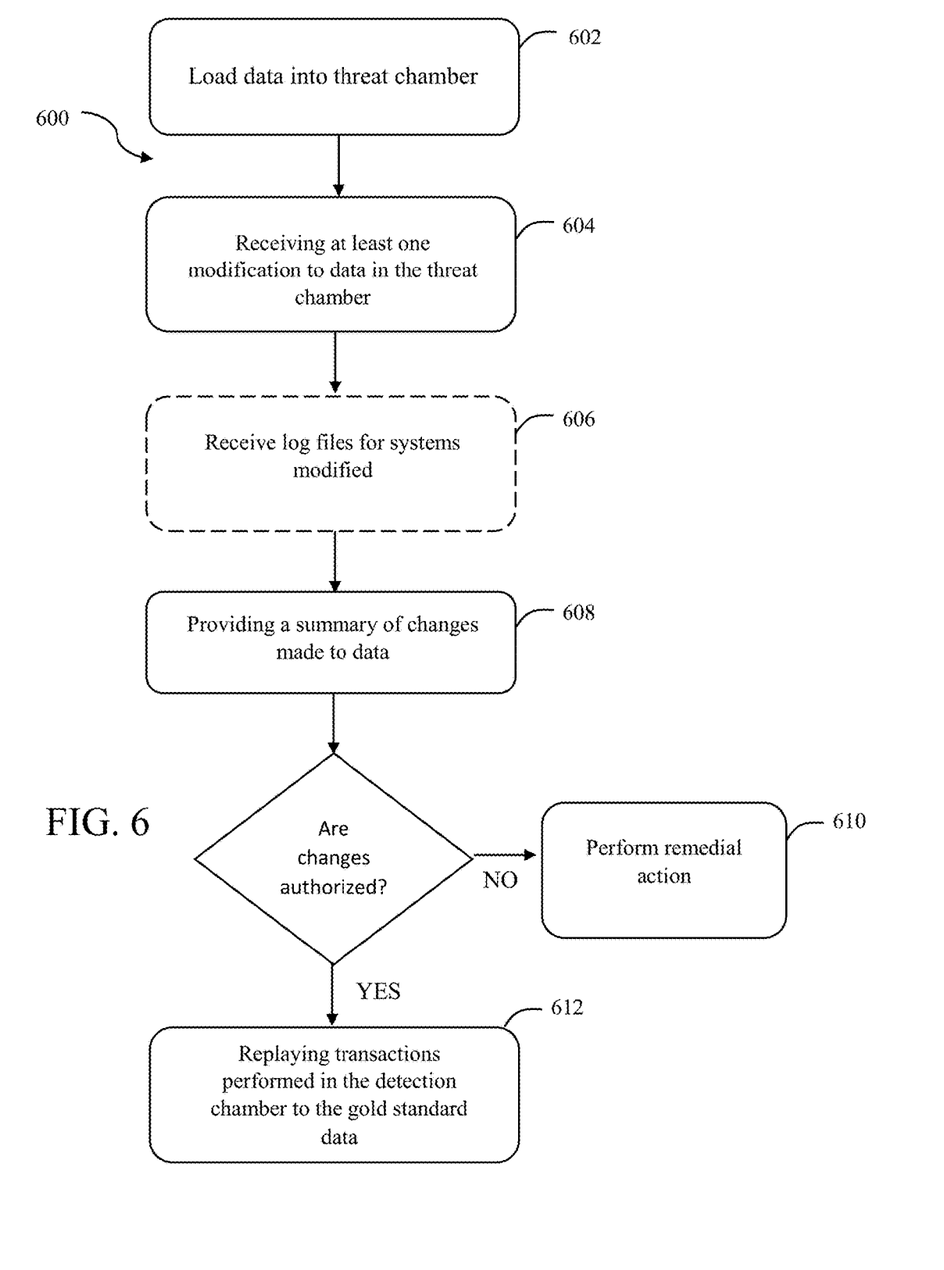
FIG. 6 depicts a flowchart of a method of providing a secure computing environment using the threat detonation chamber of FIG. 3 in accordance with one embodiment.

Referring back to FIG. 3, a threat actor may attempt to execute malicious content on the virtual appliance 302. Incoming applications such as these may be placed and executed in the threat detonation chamber 308. For example, FIG. 6 depicts a flowchart of a method 600 of providing a secure computing environment in accordance with one embodiment using the threat detonation chamber 308.

In step 602 of method 600, data is loaded into the threat detonation chamber 308. This data may include a suspect file and may be loaded into the threat detonation chamber 308 to be probed for malicious activity. Essentially, the threat chamber 308 creates a surrogate environment for the monitored execution of a suspect application. The data may include a reference transactional data set created to accomplish a set of transactions, for example. As shown in FIG. 3, the threat detonation chamber 308 may include reference data 312 (or a subset of reference data) from a production application and may include a copy of the suspect application retrieved from a known software versioning repository.

Step 604 involves receiving at least one modification to the data in the threat detonation chamber 308. For example, a user may modify the data using a suspect user application or a suspect application may execute autonomously and interact with the data.

Step 606 involves the optional step of receiving log files for modified systems. For example, the threat detonation chamber 308 may retrieve log files from the systems such as database redo logs.

Step 608 involves providing a summary of changes made to the data. This summary may be presented to a user via a user interface, for example, and may include before and after versions of all reference data set records changed. The summary may be presented to a user in a "plain English" format so that the user can readily and easily understand any changes. This comparison, therefore, may provide a user with an opportunity to determine whether the changes are correct or whether unauthorized changes were introduced into the reference data set.

Step 610 involves performing at least one remedial action. If changes were detected in step 606 that were not made by the user (but instead by a third party, for example), the user simply rejects the changes and the secure computing module 106 may perform at least one remedial action to prevent or otherwise mitigate the effects of the malicious activity. Accordingly, the module 106 may initiate a remedial action such as generating a human-readable report useful for system administrators, restarting the exploited virtual machine from an earlier checkpoint state, or issuing an alert to a system administrator.

If, on the other hand, the changes shown in step 608 are correct, the method 600 may proceed to step 612 which involves applying the transactions performed in the threat detonation chamber 308 to the reference standard data. In other words, the threat chamber 308 may apply the transactions directly to the production application using the database or filesystem transaction utilities once the changes are reviewed and approved.

Referring back to FIG. 3, the honeypot 316 may present a profile similar to an actual virtual machine while it actually executes a decoy application. If an attempt is made to access the honeypot 316 (e.g., by a threat actor who mistakenly believes the honeypot 316 is the "real" machine), the honeypot 316 may record and study the attack to learn its behavior to assist in defending against future attacks.

Threat actors such as hackers commonly initiate cyberattacks by first mapping a network to learn about computers, IP addresses, and open ports on the network. The threat actor is then able to determine computers of interest to attack (e.g., due to an identified vulnerability), and then begin a series of attacks on the identified computers using the identified vulnerability.

The honeypot 316 may therefore assist in providing secure computing environments in at least three regards: (1) the honeypot 316 hides important assets on the network by presenting as a decoy asset with similar attributes; (2) the honeypot 316 enables a user to monitor and learn from the threat actor's actions so that the user can take countermeasures to frustrate future attacks; and (3) the honeypot 316 can monitor attack rates so that the network can be remapped, thereby interrupting the threat actor's kill chain.

The secure computing module 106 may include one or more honeypots 316 for protocols such as file transfer protocol (FTP), secure shell (SSH), simple network management protocol (SNMP), or the like. In various embodiments, it is contemplated that a user interface may enable a user to configure the honeypot 316 they want to deploy by entering certain configuration parameters (i.e., parameters that cannot be discovered from the environment) and then deploy the defined honeypot configuration.

Once deployed, the honeypot 316 may open one or more ports on a virtual server. Real users are generally unaware of these systems, so the polymorphic attack surface may assume that any user that connects with the honeypot 316 is a threat actor intending to discover more information about the secure computing module 106. The honeypot 316 may therefore use aggressive logging to monitor actions of the user.

Threat actors commonly aim to avoid machines they deem to be honeypots to prevent their techniques and identities from being discovered. In accordance with features of the invention, therefore, the encrypted appliance 302 may take steps to make a protected VM appear very similar to the honeypot 316. This increases the likelihood that the threat actor will refrain from attacking the protected VM to avoid being identified and having their attack techniques compromised.

In one embodiment the secure computing module 106 may comprise a hybrid of a host and honeypot by acting both as a legitimate computer and a honeypot using unused ports. A threat actor may assume that the high-value protected host is actually a high risk honeypot.

This configuration enables a number of features, any combination of which can be used to at least assist in securing computing environments. For example, the combined configuration of the computer and honeypot may, for example, modify outgoing network packets to spoof the host's operating system and application fingerprints (along with any other type of identification information) to at least confuse the threat actor.

In addition to modifying outgoing communications, the secure computing module 106 may disguise or otherwise alter certain characteristics of the applications running on the protected hosts to reduce the possibility of identifying the platform based on application-related patterns. Additionally, the secure computing module 106 may automatically alter observable network characteristics of the protected host as needed (e.g., based on semantic policy guidelines).

In another embodiment, the secure computing module 106 may relocate a particular operating system and/or application. For example, the virtualized host (as well as virtual applications running thereon) may be transferred to another machine to minimize the effectiveness of cyberattacks. User settings and state information may be transferred to the new location as well to minimize the effect of the transfer on a user.

In yet another embodiment, the secure computing module 106 may change the IP address of the host, thereby making the host harder to target by threat actors. Any resulting disruption to remote clients of services running on the host can at least be mitigated by using existing IP hopping schemes. For example, the secure computing module 106 may use a coordinating entity acting as an IP address directory for authenticated users. These operations can be carried out at specified time intervals and/or when cyber reconnaissance attempts or attacks are recognized.

The secure computing module 106 may further be configured to initiate platform service requests (PSRs). PSRs may be node-initiated actions that result in platform snapshots (i.e., information about the state of a platform). PSRs may be initiated automatically at specified time intervals or whenever requested by a user, for example. Or, if a threat has been detected, PSRs may be initiated at more frequent intervals.

Responses to PSRs may include information related to the state of a node. For example, a response may include information related to virtual memory usage. Or, the response(s) may include information about individual processes (e.g., the number of file handles used by a given process). For example, if Node0 is a UNIX platform, a PSR to Node0 from Monitor0 may involve Monitor0 opening an SSH connection to Node0 and requesting information about the current processor load and memory footprint on that machine. Or, if Node0 were a Windows® platform, the PSR to that machine could be achieved using the Windows Management Instrumentation (WMI) interface.

The response to a PSR may vary and depend on the information requested by the PSR. The amount and type of information returned by a PSR may be referred to as PSR granularity. For example, information such as the routing table from a remote machine or information about each thread running in each process, along with any open file handles owned by each process may be referred to as "fine-grained" information. This information may be needed much less frequently than "coarse-grained" information, such as the number of running threads or connected remote machines. The secure computing module 106 may issue PSRs and receive platform information from multiple remote nodes concurrently.

Features of the present invention are designed to integrate easily into an existing enterprise architecture. This architecture may include arbitrarily complex heterogeneous systems including various flavors of networked UNIX, Windows, and even virtualized or mobile platforms. The various functions of the secure computing module 106 may be distributed across a number of remote monitoring processes that may communicate via existing TCP/IP-based protocols. Each monitoring process is responsible for handling a subset of nodes in the network. These monitoring processes need not be deployed within the monitored network so long as they have remote access permissions. Thus, the operational overhead of installing the secure computing module 106 on existing enterprise networks is minimal and the secure computing module 106 can accommodate an arbitrarily large network simply by using more monitoring nodes.

Over time, data regarding various platforms and processes running thereon may be merged into a model of how each platform behaves using machine learning and data mining techniques. These techniques may generalize the behavior of a given node by inductively extracting constraints from behavior snapshots retrieved over time. These constraints may be placed in a trained execution model (TEM) and compared with new, observed behaviors. The newest monitoring data for each node may be compared to TEMs to determine whether previously unseen and potentially problematic behavior has emerged on a system.

Accordingly, one innovation of the secure computing module 106 is that rules describing normal behavior patterns are derived automatically from live data and in at least substantially real time. As mentioned previously, the secure computing module 106 may perform at least one remedial action in accordance with a policy if problematic behavior has emerged.

For example, the secure computing module 106 of FIG. 1 may be implemented as a deployable appliance that provides security protection for institutions such as small and mid-size business entities. This appliance may simply be plugged into a network (without requiring an IT expert) to start collecting information regarding the network (e.g., what cyber policy items are in compliance and which ones are not).

Figure 7:
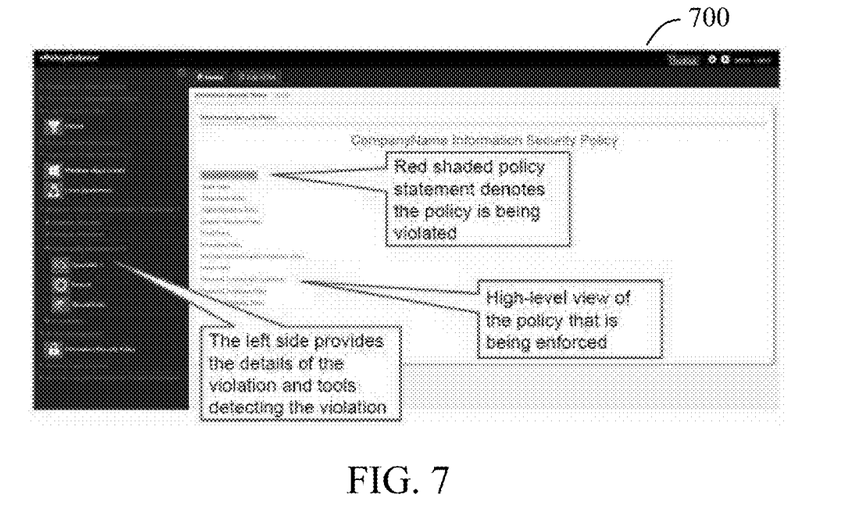
FIG. 7 depicts a user interface in accordance with one embodiment.

Once the deployable appliance is connected with a network, a GUI may present a display to a user. For example, FIG. 7 depicts a user interface 700 displaying information related to a security policy of a network. As shown, the interface 700 may display information regarding a particular policy that is being enforced, whether that policy is being violated, and details of the violation.

Figure 8:
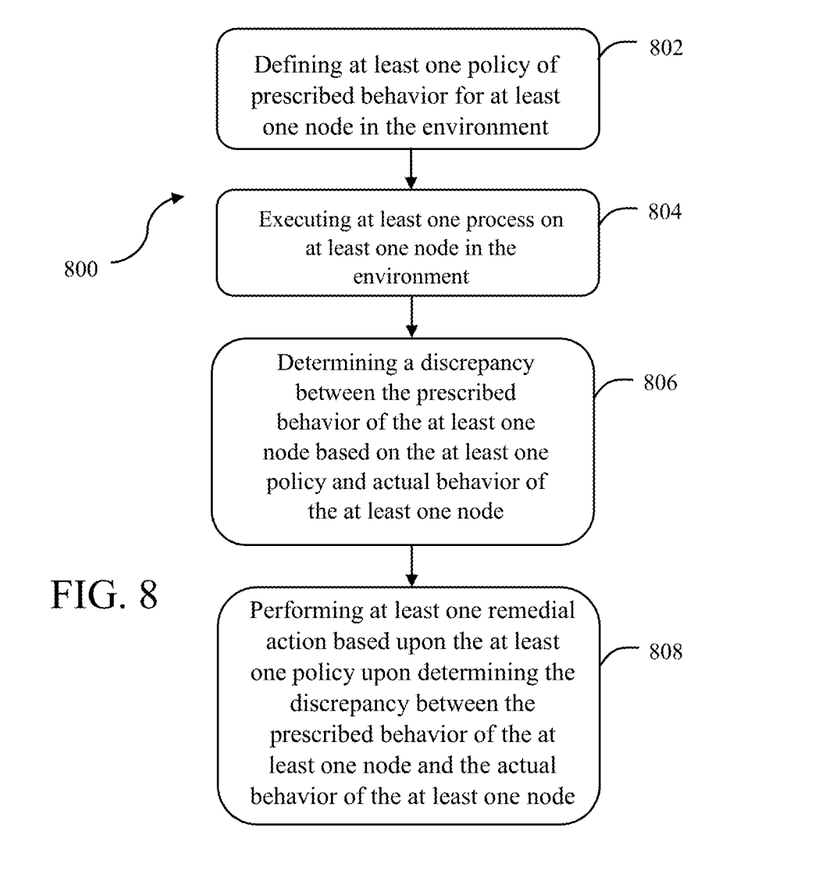
FIG. 8 depicts a flowchart of a method of providing a secure computing environment in accordance with one embodiment.

FIG. 8 depicts a flowchart of a method 800 of providing a secure computing environment in accordance with one embodiment. Step 802 involves defining at least one policy of prescribed behavior for at least one node in the environment. A policy may be as simple as "ensuring particular software patches are up to date," for example. The policies that are specified may of course vary and depend on a given enterprise.

Step 804 involves executing at least one process on at least one node in the environment. This process may be executed in a threat detonation chamber in operable connectivity with the node.

Step 806 involves determining a discrepancy between the prescribed behavior of the at least one node based on the at least one policy and actual behavior of the at least one node. For example, certain changes made to an application may suggest compromise by a third party. Or, attempts to initiate an outgoing FTP transfer may be indicative of an exfiltration attempt by a third party. Other types of behavior may relate to memory usage, a number of processes being executed, and processor load. These observations may represent discrepancies from the prescribed behavior of a node based on a policy, and information regarding the node's behavior may be gathered intermittently or continuously and sometimes at least substantially in real time.

Step 808 involves performing at last one remedial action based upon the at least one policy upon determining the discrepancy between the prescribed behavior of the at least one node and the actual behavior of the at least one node. If certain discrepancies between the node's actual behavior and the prescribed behavior based on a policy exist, the secure computing module 106 may initiate at least one remedial action. For example, the secure computing module 106 may restart an exploited node from an earlier checkpoint and/or generate a human-readable report to inform a system administrator of the discrepancy.

In accordance with another embodiment, the remedial action may be to relocate a second process from a first node to a second node in response to an attack upon the environment. For example, if an attack upon a computing environment is detected, processes may be moved to a different node to at least mitigate the effect of any malicious processes.

In accordance with another embodiment, the remedial action may be to modify an outgoing message from a second process to change an operating system identifier or an application identifier in the outgoing message. These steps are essentially spoofing techniques to feed the attacker false information about the protected host, thereby at least confusing and frustrating the threat actor.

In yet another embodiment, the remedial action may be to change an IP address of a node in the environment. Changing the IP address of a particular host may make it harder to target by threat actors, for example.

The above mentioned remedial actions may introduce a level of falsification and dynamism to protect client and server hosts alike from cyber-reconnaissance efforts. Additionally, these actions minimally impact legitimate users of systems.

Figure 9:
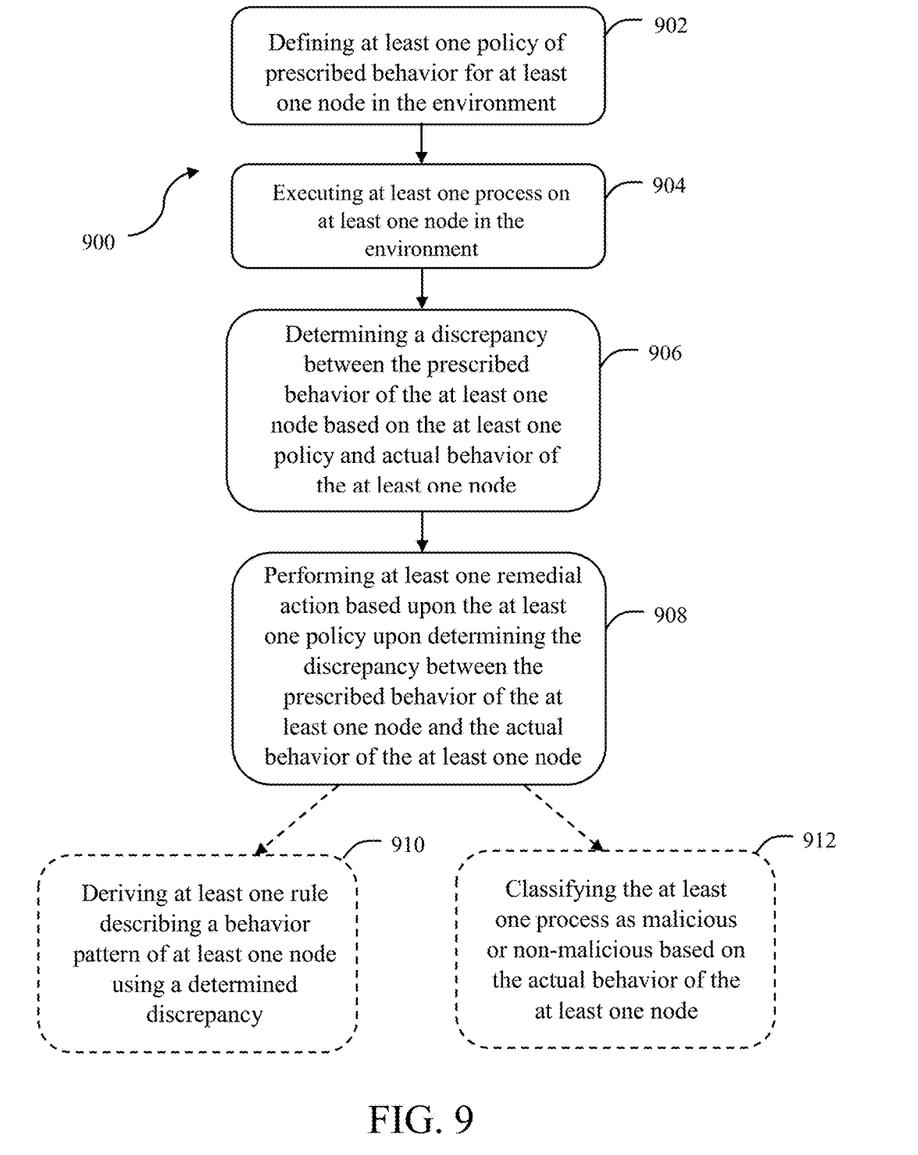
FIG. 9 depicts a flowchart of a method of providing a secure computing environment in accordance with another embodiment.

FIG. 9 depicts a flowchart of a method 900 of providing a secure computing environment in accordance with another embodiment. Steps 902, 904, 906, and 908 are similar to steps 802, 804, 806, and 808 of FIG. 8, respectively, and are not repeated here.

Step 910 is optional and involves deriving at least one rule describing a behavior pattern of at least one node using a determined discrepancy. The at least one rule may be derived automatically from live data, and may further be used to describe and/or enforce a policy in the future.

Step 912 is optional and involves classifying the at least one process as malicious or non-malicious based on the actual behavior of the at least one node. Steps 910 and 912 may be performed in conjunction with each other. For example, the rule generated in step 910 may be to prohibit future execution of a process that was classified as malicious in step 912.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for providing a secure computing environment, the method comprising:
   defining at least one policy of prescribed behavior for at least one processor in the environment, wherein the at least one processor is configured to execute at least one process;
   executing, using at least one classification module executing computer code stored on at least one memory, the at least one process on the at least one processor in the environment;
   determining, using the at least one classification module, a discrepancy between the prescribed behavior of the at least one processor based on the at least one policy and actual behavior of the at least one processor, wherein the actual behavior of the at least one processor includes at least one of memory usage, a number of processes being executed, and processor load;
   classifying the at least one process as malicious or non-malicious based on the actual behavior of the at least one processor; and
   performing, using the at least one classification module, at least one remedial action based upon the at least one policy upon determining the discrepancy between the prescribed behavior of the at least one processor and the actual behavior of the at least one processor, wherein the at least one remedial action is at least one of relocating a second process from a first processor to a second processor in response to an attack upon the environment and changing an internet protocol (IP) address of a processor in the environment.

2. The method of claim 1, wherein the at least one remedial action includes one or more of restarting an exploited processor within the environment and generating a report.

3. The method of claim 1, wherein the actual behavior of the at least one processor includes data regarding the actual behavior of the at least one processor obtained in real time.

4. The method of claim 1, further comprising deriving at least one rule describing a behavior pattern of at least one processor using the determined discrepancy.

5. The method of claim 1, further comprising modifying an outgoing message from a second process to change an operating system identifier or an application identifier in the outgoing message.

6. A secure computing system comprising:
at least one processor for executing at least one process; and
a classification module executing computer code stored on at least one memory and configured to:
execute the at least one process on the at least one processor in the environment;
determine a discrepancy between prescribed behavior of the at least one processor based on at least one policy of prescribed behavior and the actual behavior of the processor, wherein the actual behavior of the at least one processor includes at least one of memory usage, a number of processes being executed, and processor load; and
classify a first process as malicious or non-malicious based on the actual behavior of the at least one processor;
perform at least one remedial action based upon the at least one policy upon determining the discrepancy between the prescribed behavior of the at least one processor and the actual behavior of the at least one processor,
wherein the at least one remedial action is at least one of relocating a second process from a first processor to a second processor in response to an attack upon the environment and changing an internet protocol (IP) address of a processor in the environment.

7. The system of claim 6, wherein the at least one remedial action includes one or more of restarting an exploited processor within the environment and generating a report.

8. The system of claim 6, wherein the actual behavior of the at least one processor includes data regarding the actual behavior of the at least one processor obtained in real time.

9. The system of claim 6, wherein the classification module is further configured to derive at least one rule describing a behavior pattern of at least one processor using the determined discrepancy.

10. The system of claim 6, wherein the classification module is further configured to modify an outgoing message from a second process to change an operating system identifier or an application identifier in the outgoing message.

11. A non-transitory computer readable medium containing computer-executable instructions for performing a method for providing a secure computing environment, the medium comprising:
computer-executable instructions for defining at least one policy of prescribed behavior for at least one processor in the environment, wherein the at least one processor is configured to execute at least one process;
computer-executable instructions for executing, using at least one classification module executing computer code stored on at least one memory, the at least one process on the at least one processor in the environment;
computer-executable instructions for determining, using the at least one classification module, a discrepancy between the prescribed behavior of the at least one processor based on the at least one policy and the actual behavior of the at least one processor,
wherein the actual behavior of the at least one processor includes at least one of memory usage, a number of processes being executed, and processor load;
computer-executable instructions for classifying the at least one process as malicious or non-malicious based on the actual behavior of the at least one processor; and
computer-executable instructions for performing, using the at least one classification module, at least one remedial action based on the at least one policy upon determining the discrepancy between the prescribed behavior of the at least one processor and the actual behavior of the at least one processor,
wherein the at least one remedial action is at least one of relocating a second process from a first processor to a second processor in response to an attack upon the environment and changing an internet protocol (IP) address of a processor in the environment.

12. The secure computing system of claim 6, wherein the secure system of claim 10 is readily deployable to at least one external enterprise system.

13. The method of claim 1, further comprising creating a transactional data set to accomplish a set of transactions; and comparing the transactional data set to a reference data set after the process is executed on the at least one processor to determine whether any changes were made to the transactional data set.

* * * * *